United States Patent
Kasper, II et al.

(10) Patent No.: US 7,330,423 B2
(45) Date of Patent: Feb. 12, 2008

(54) HIGH-SPEED DIGITAL SUBSCRIBER LINE (HDSL) PACKET ABORT RETRY DURING CHANNEL BLOCKING

(75) Inventors: David J. Kasper, II, Aliso Viejo, CA (US); Laxman Anne, Minnetonka, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1019 days.

(21) Appl. No.: 10/179,566

(22) Filed: Jun. 25, 2002

(65) Prior Publication Data

US 2003/0235201 A1    Dec. 25, 2003

(51) Int. Cl.
*H04L 12/28* (2006.01)
*H04L 12/56* (2006.01)

(52) U.S. Cl. .................. 370/216; 370/241.1; 370/242; 375/222

(58) Field of Classification Search ................ 370/216, 370/241.1, 242, 394; 375/222
See application file for complete search history.

(56) References Cited

U.S. PATENT DOCUMENTS

| | | | |
|---|---|---|---|
| 5,128,692 A * | 7/1992 | Reisch ........................ 347/252 |
| 5,796,742 A * | 8/1998 | Klotzbach et al. .......... 370/466 |
| 6,185,191 B1 * | 2/2001 | Dipperstein .................. 370/249 |
| 6,385,372 B1 * | 5/2002 | Wang et al. ................... 710/56 |
| 6,694,470 B1 * | 2/2004 | Palm .......................... 714/748 |
| 7,099,289 B2 * | 8/2006 | Varma ......................... 370/278 |
| 7,102,671 B1 * | 9/2006 | Asnaashari ............... 348/231.9 |
| 2003/0165120 A1 * | 9/2003 | Uesugi et al. .............. 370/282 |
| 2003/0223761 A1 * | 12/2003 | Brown et al. ................ 398/183 |

* cited by examiner

*Primary Examiner*—Min Jung
(74) *Attorney, Agent, or Firm*—Fogg & Powers LLC (57) ABSTRACT

An apparatus and method is described that allows for improved transmission of EOC data over the EOC channels of communication devices and links, reducing the number of dropped EOC packets and increasing the bandwidth and robustness of the EOC channel. The improved device apparatus and method also allows for the reduction of the overhead of EOC channel error detection and correction on the limited resources of the communication device by aborting a corrupted or blocked EOC packet transmission and automatically resending. The improved device apparatus and method additionally allows the reduction of dropped EOC data packets due to corrupted transmission and the resultant miscommunication and corruption of high-level applications of the communication device, such as operation commands, remote configuration and management programs, and operation displays.

62 Claims, 3 Drawing Sheets

Fig. 3

HIGH-SPEED DIGITAL SUBSCRIBER LINE (HDSL) PACKET ABORT RETRY DURING CHANNEL BLOCKING

TECHNICAL FIELD

The present invention relates generally to communication devices and in particular the present invention relates to embedded operation channel (EOC) data transmission in communication devices.

BACKGROUND

Many modem communication systems allow for inter-link operation communications and maintenance commands between the coupled communication devices by the utilization of message packets passed over the communication link on a limited bandwidth embedded operations channel (EOC). The EOC is incorporated into the transfer protocol. One recent such communications link and protocol is the high-speed digital subscriber line (HDSL), also known as the high-bit-rate digital subscriber line (HDSL), which has 2 wire and 4 wire variants (HDSL2 and HDSL4). The HDSL2 and HDSL4 protocols are defined in industry standards (ANSI T1E1.418) to provide for common conventions and interoperability between HDSL communication devices from differing manufacturers. In particular, the EOC message packets allow configuration and management of such communication devices as the central office (CO) HDSL communication device and the customer premise equipment (CPE)/remote (RMT) HDSL communication device by the remote operation of their configuration menus across the HDSL communication link through the EOC channel embedded within the HDSL protocol and framing. In managing and configuring an HDSL communication device across an HDSL communication link, a technician or system operator connects to a local HDSL device with a terminal device or interface device. The system operator then utilizes the terminal device and local HDSL device to connect to the remote HDSL communication device being configured through the EOC channel of the HDSL communication link. Once connected the system operator generally utilizes a menu generated by a configuration application running on the distant HDSL communication device to manage and configure the device. Typically the interface device or terminal device utilized by the system operator to interface with the local HDSL communication device is a text or ASCII terminal. Other terminal types, such as a graphics user interface (GUI), are known and utilized for this purpose.

A common problem in communicating across the EOC channel occurs when there are errors in transmission of the EOC data/frame of the communication link, also known as EOC channel blocking. The EOC data packet portion of the datastream is corrupted, and thus when it is received the frame check sequence (FCS) of the EOC packet is checked against the contents of the packet and the packet is discarded because of the corruption. A corrupt EOC packet that has been discarded is typically not resent and is therefore lost. This loss of inter-link operation communications and maintenance commands can cause major problems in the overall operation of the communication link and the coupled communication devices. In particular, this is a problem for system operators engaged in remotely managing and/or configuring a distant communication device over the EOC channel; the corrupted EOC packets are discarded by the receiving communication device and therefore the high end applications or the system operator's terminal device they are destined for never receives them. This can lead to many issues such as corrupted screens and menus on the system operator's terminal, failed status updates, and misconfigurations of the distant communication device due to dropped packets.

An additional problem is the typically limited resources of the communication devices. Communication devices typically will utilize an embedded processor and memory system with a size and throughput that is closely matched to the needs of operating the communication device in a real time manner to reduce overall costs and power requirements of the system. Therefore, there is generally not an excess of spare resources available to devote to dealing with generating the configuration menu, communicating over the EOC channel, and operating a complex EOC channel error correction system in addition to the normal requirements of maintaining and operating a communication link.

For the reasons stated above, and for other reasons stated below which will become apparent to those skilled in the art upon reading and understanding the present specification, there is a need in the art for a method and apparatus for conveniently detecting and correcting for EOC packet transmission errors in communication devices and, in particular, HDSL communication devices.

SUMMARY

The above-mentioned problems with detecting and correcting for EOC packet transmission errors in communication devices are addressed by embodiments of the present invention and will be understood by reading and studying the following specification.

In one embodiment, a communication device comprises a processor, a packet buffer coupled to the processor, at least one communication interface, a chipset coupled to the at least one communication interface and the processor, wherein the chipset communicates through the communication interface using a communication protocol having an embedded operation channel (EOC), wherein the processor is adapted to transmit data from the packet buffer across the EOC channel of the communication protocol utilizing a read buffer pointer to mark the start of untransmitted data in the packet buffer, and wherein the processor is adapted to reset the read buffer pointer to the start of the packet buffer when a transmission error is sensed on the EOC channel.

In another embodiment, a communication system comprises a communication link carrying a communication protocol with an embedded operation channel (EOC), and a plurality of communication devices coupled to the communication link, wherein at least one of the plurality of communication devices comprises a processor, a packet buffer coupled to the processor, a chipset coupled to the communication link and the processor, wherein the chipset communicates on the communication link utilizing a communication protocol, wherein the processor is adapted to transmit data from the packet buffer across the EOC channel of the communication link utilizing a read buffer pointer to mark the start of untransmitted data in the packet buffer, and wherein the processor is adapted to reset the read buffer pointer to the start of the packet buffer when a transmission error is sensed on the EOC channel.

In yet another embodiment, a method of operating a communication device comprises sending data on an embedded operation channel (EOC) of a communication interface from data stored in a packet data buffer, wherein a buffer pointer is utilized in transferring data in the data buffer, and resetting the buffer pointer to the start of data in the packet buffer when an EOC transmission error occurs.

In a further embodiment, a method of operating a communication system comprises transmitting data from a packet buffer of a first communication device on an embedded operation channel (EOC) of a coupled communication link, receiving data at one or more second communication devices from the EOC channel of the communication link, and restarting transmission of the data from the packet buffer of the first communication device when an EOC transmission error occurs.

In yet a further embodiment, a machine-usable medium having machine-readable instructions stored thereon for execution by a processor of a communication device to perform a method. The method comprising sending data on an embedded operation channel (EOC) of a communication interface from data stored in a packet data buffer, wherein a buffer pointer is utilized in transferring data in the data buffer, and resetting the buffer pointer to the start of data in the packet buffer when an EOC transmission error occurs.

In another embodiment, a method of operating a communication device comprises transmitting an EOC data packet on an embedded operation channel (EOC) of a communication interface from a packet buffer, wherein a buffer pointer is utilized in transferring the EOC data packet from the packet buffer to a communication interface circuit, aborting transmission of EOC data packet when an EOC transmission error occurs, and retrying transmission of the EOC data packet by resetting the buffer pointer to the start of the EOC data packet in the packet buffer.

Other embodiments are described and claimed.

DETAILED DESCRIPTION

In the following detailed description, reference is made to the accompanying drawings that form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Embodiments of the present invention utilize an improved apparatus and/or method to reduce the number of dropped EOC packets and increase the bandwidth and robustness of the EOC channel by sensing a transmission error at the sending communication device and aborting the transmission and retrying the transmission. This EOC packet transmission abort and retry is achieved by resetting the pointer of the EOC channel packet buffer to its beginning such that the current EOC packet transmission is halted and is then re-sent. Because bad or corrupted packets are aborted and resent during transmission, the packet re-send is accomplished with a minimum of overhead and impact upon on resource limited communication device embedded processors and memory systems. In another embodiment of the present invention, a communication device with a higher level application communicating through the EOC channel senses an error in transmission of an EOC packet and restarts transmission of the current EOC packet of the communication device. In one embodiment of the present invention, a communication system with a communication device is remotely managed and configured by an internal management program through the EOC channel of the communication device senses an error in transmission of an EOC packet and resets the EOC buffer pointer to re-send the current EOC packet. This reduces the dropped EOC packets and errors seen by a terminal device coupled through a local communication device and EOC channel to the remote communication device being configured. In another embodiment of the present invention, an HDSL communication system with an HDSL communication device is remotely managed and configured by an internal management program through the EOC channel of the HDSL communication device detects an error in transmission of an EOC packet and resets the EOC buffer pointer to re-send the current EOC packet.

Figure 1:
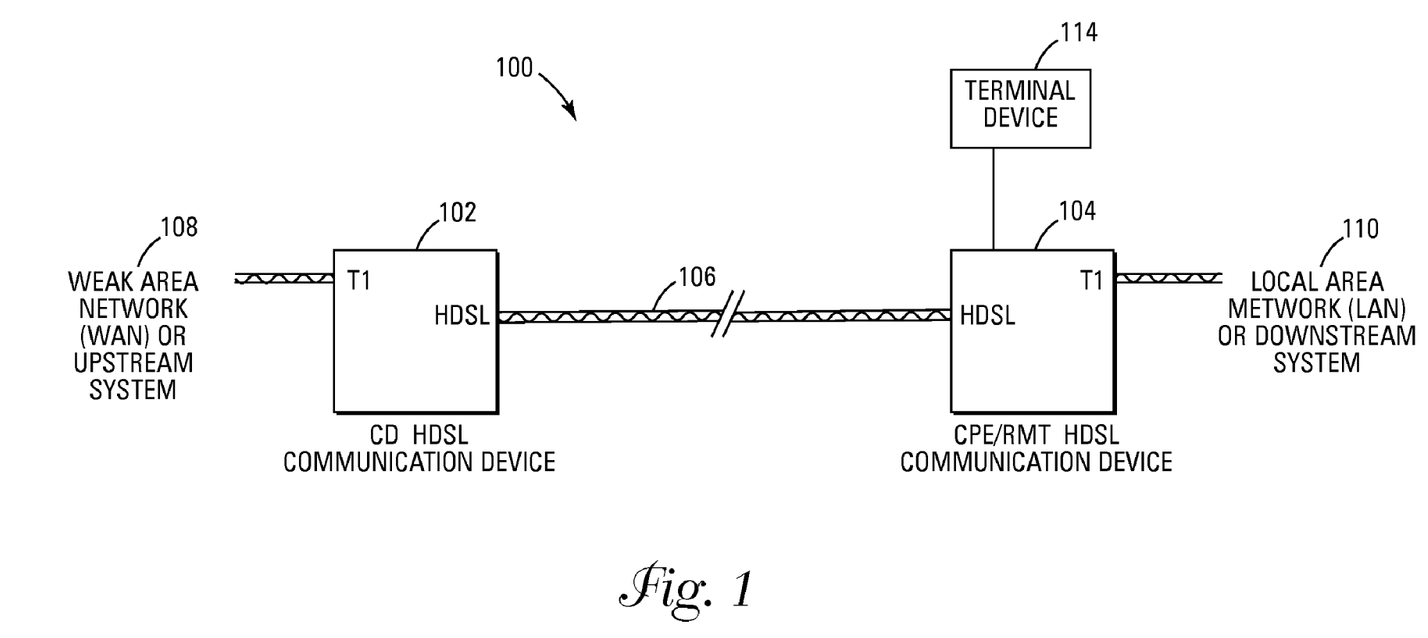
FIG. 1 is a simplified diagram of an HDSL communication system according to one embodiment of the present invention.

FIG. 1 is a simplified diagram of an HDSL communication system 100 according to one embodiment of the present invention. In FIG. 1, the HDSL communication system 100 contains two HDSL communication devices 102, 104 that are coupled through an HDSL communication link 106 which can be considered either a two or four wire HDSL communication link 106 for the purposes of the present disclosure. The central office (CO) HDSL communication device 102 transmits a datastream containing user data from an upstream system or WAN 108 through the HDSL communication link 106 with HDSL framing protocol containing an EOC channel to the customer premise equipment (CPE) or remote (RMT) HDSL communication device 104 and local network or downstream system 110. The CPE HDSL communications device 104 in turn transmits user data between the local network or downstream system 110 through the HDSL communication link 106 with HDSL framing protocol containing an EOC channel to the CO HDSL communication device 102 and upstream system or WAN 108. The communication protocols and/or datastreams that can be transmitted through the HDSL communication link include, but are not limited to T1, Ethernet, E1, or ISDN. The systems that could comprise the local network or system 110 and upstream system or WAN 108 include, but are not limited to, a standalone device, a phone system, a computer network, or computer. The EOC channel allows for control, operation, management, and configuration information to be passed in EOC packets between the HDSL communication devices 102, 104 coupled to the HDSL communication link 106.

A terminal device 114 is optionally coupled to the CPE HDSL communication device 104 through a "craft port" (not shown, generally a RS-232 port). The terminal device 114 allows management of the local CPE HDSL communication device 104 by a system operator. The terminal device 114 also allows for remote configuration of the CO HDSL communication device 102 from the CPE HDSL communication device 104 over the EOC channel of the HDSL communication link 106 utilizing EOC packets. In one embodiment, a craft port is also be located on the CO HDSL communication device 102 and, in one embodiment, allows for remote configuration of the CPE HDSL communication device 104 over the EOC channel from the CO HDSL communication device 102.

In operation, in HDSL communication system 100 of FIG. 1, when an HDSL communication device 102, 104 places an EOC packet on the HDSL communication link by sequentially placing data segments of the EOC packet, typically segmented into octets where several octets can be sent per EOC frame, from an internal transmission buffer into an HDSL communication circuit or chipset of the HDSL communication device that operates as a synchronous serial transceiver. The HDSL communication device then watches to see if a transmission error is signaled by the HDSL communication circuit or chipset. If an error is sensed during transmission of the EOC packet the HDSL communication device resets the internal transmission buffer so that the current EOC packet in the buffer is retransmitted. Because the buffer is being retransmitted it is not available to be released and refilled with the next packet waiting to be transmitted over the EOC channel. A released buffer is typically refilled by one or more high-level applications executing on the HDSL communication device. Typically a memory pointer or buffer pointer is utilized by the HDSL communication device to transfer data from the transmission packet buffer to the HDSL communication circuit or chipset of the HDSL communication device, wherein the memory pointer is incremented to point to the next data segment of the EOC packet to be transmitted in the packet buffer. In one embodiment, this buffer or buffer pointer is reset as soon as a transmission error is sensed so that the current packet transmission is aborted and restarted. In another embodiment, the packet buffer or memory pointer is reset after the errored transmission completes, keeping the current EOC packet in the buffer for retransmission. It is noted that the transmission buffer can be a fixed memory device or memory address space, or a temporary memory address space of a general use memory of the HDSL communication device that is set up and utilized as needed.

Figure 2:
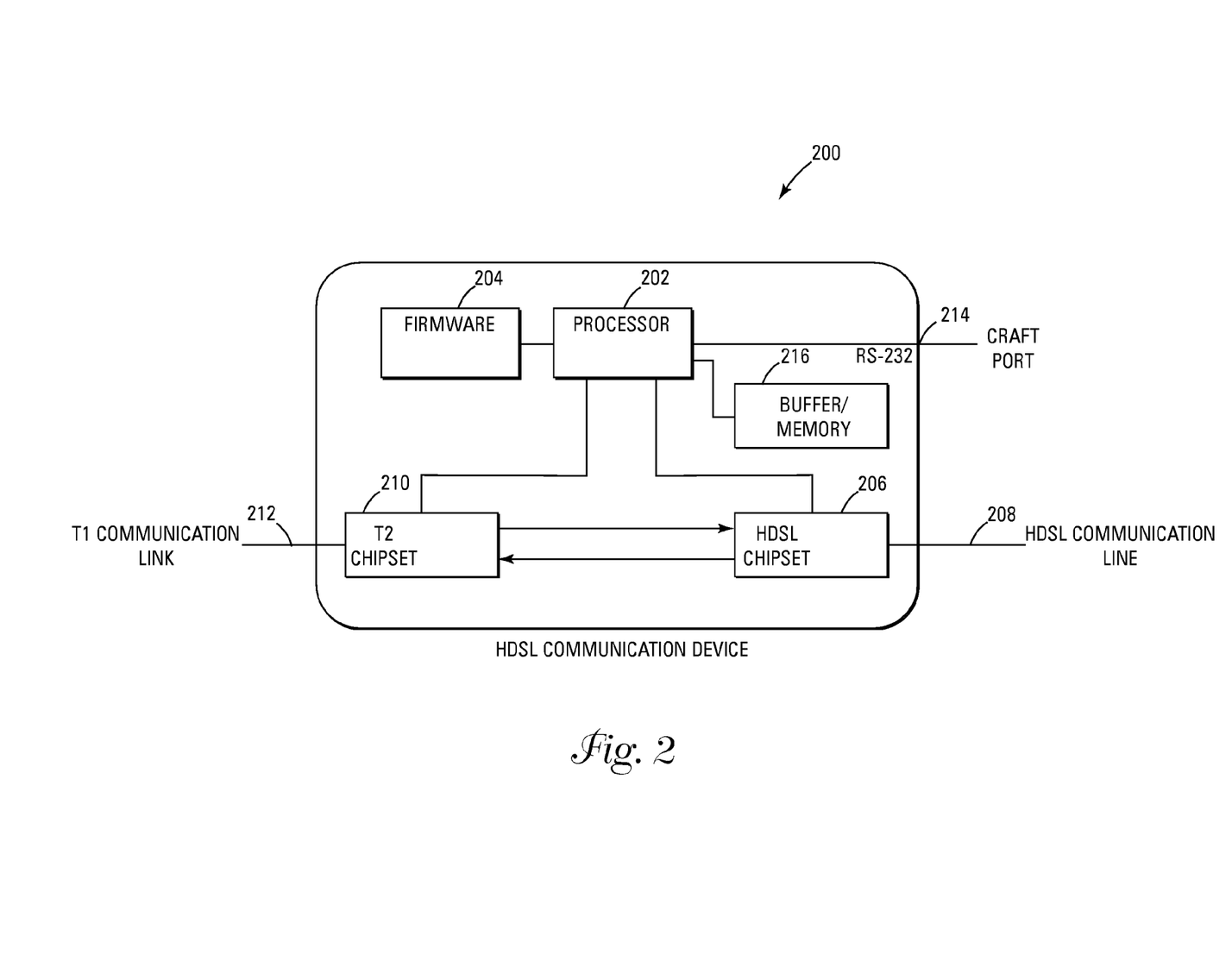
FIG. 2 is a simplified diagram of an HDSL communication device according to one embodiment of the present invention.

FIG. 2 is a simplified diagram of an HDSL communication device 200 according to one embodiment of the present invention. HDSL communication device 200 of FIG. 2 is considered either a central office (CO) HDSL communication device in one embodiment or a customer premise equipment (CPE) or remote (RMT) HDSL communication device in another embodiment. In one embodiment the HDSL communication device is either a two or four wire HDSL communication link 208 for the purposes of the present disclosure. Communication device 200 has an HDSL interface 208 that is coupled to an HDSL communication link that utilizes HDSL communication signaling protocol containing an EOC communication channel. In one embodiment, communication device 200 includes a T1 or E1 interface 212 that is coupled to either a WAN (if a CO device) or a local network (if a CPE device) with a T-carrier T1 or E1 link that utilizes American National Standards Institute (ANSI) T1.107 standard digital signal 1 (DS1) signaling. Communication device 200 internally contains a processor 202, T1/E1 interface circuit or chipset 210, HDSL interface circuit or chipset 206, a buffer device or buffer memory space 216, and non-volatile machine usable firmware storage media 204, such as a Flash memory or the like. HDSL interface circuit 206 is coupled to HDSL interface 208 and T1/E1 interface circuit 210 is coupled to T1 interface 212 of communication device 200. In one embodiment, a terminal device (not shown) is coupled to HDSL communication device 200 through a "craft port" 214, which is generally a RS-232 compatible serial port. Craft port 214 allows management of a local or remote communication device 200 by a system operator. HDSL interface 208 also allows for remote configuration of the HDSL communication device 200 from coupled remote HDSL communication device (not shown) over the EOC channel of an HDSL communication link (not shown).

Internally, HDSL interface circuit 206 is coupled to T1/E1 interface circuit 210 to pass data bi-directionally through communication device 200 between T1/E1 interface 212 to HDSL interface 208. Processor 202 is coupled to T1/E1 interface circuit 210 and HDSL interface circuit 206 and controls and communicates with them. Processor 202 is also coupled to firmware storage media 204, which contains software routines or firmware required to initialize, configure, and operate communication device 200. Storage media 204 also contains any software routines and data that are utilized to generate configuration and management menus and communicate through the EOC channel. Craft port 214 is coupled to processor 202 and enables communication with the communication device 200 or to a coupled remote HDSL communication device (not shown) over the EOC channel by a system operator utilizing a terminal device. It is noted that other communication interfaces, dataports, communication busses, and/or other proprietary communication interface or protocol can also be included in various embodiments of HDSL communication device 200 of FIG. 2, increasing communication options and configurations.

Software routines that initialize and operate communication devices, such as the HDSL communication device 200 described in FIG. 2, are collectively referred to as firmware or ROM after the non-volatile read only memory (ROM) machine usable storage device that such routines have historically been stored in. It is noted that such firmware or ROM routines are stored on a variety of machine usable storage mediums or firmware storage mediums that include, but are not limited to, a non-volatile Flash memory, a read only memory (ROM), an electrically erasable programmable read only memory (EEPROM), a one time programmable (OTP) device, a complex programmable logic device (CPLD), an application specific integrated circuit (ASIC), a magnetic media disk, etc. It is also noted that HDSL communication devices can take multiple other physical forms, including, but not limited to, HDSL communication devices that are functions of other systems, or network elements that have the HDSL communication device functionality expressed in firmware or even hard-coded in a device such as an application-specific integrated circuit (ASIC) chip.

In operation, HDSL communication device 200 of FIG. 2 tests for a transmission error when it transmits an EOC packet on the HDSL interface 208. If an EOC channel transmission error has occurred it is indicated by the HDSL interface circuit or chipset 206. If an error is sensed during transmission of the EOC packet processor 202 of HDSL communication device 200 resets transmission buffer 216 so that the current EOC packet in the buffer 216 is retransmitted and the buffer 216 is not filled with the next packet. In one embodiment, the buffer 216 is reset as soon as a transmission error is sensed so that the current packet transmission is aborted and restarted. In another embodiment, the packet buffer 216 is reset after the errored transmission completes, keeping the current EOC packet in the buffer 216 for retransmission.

Figure 3:
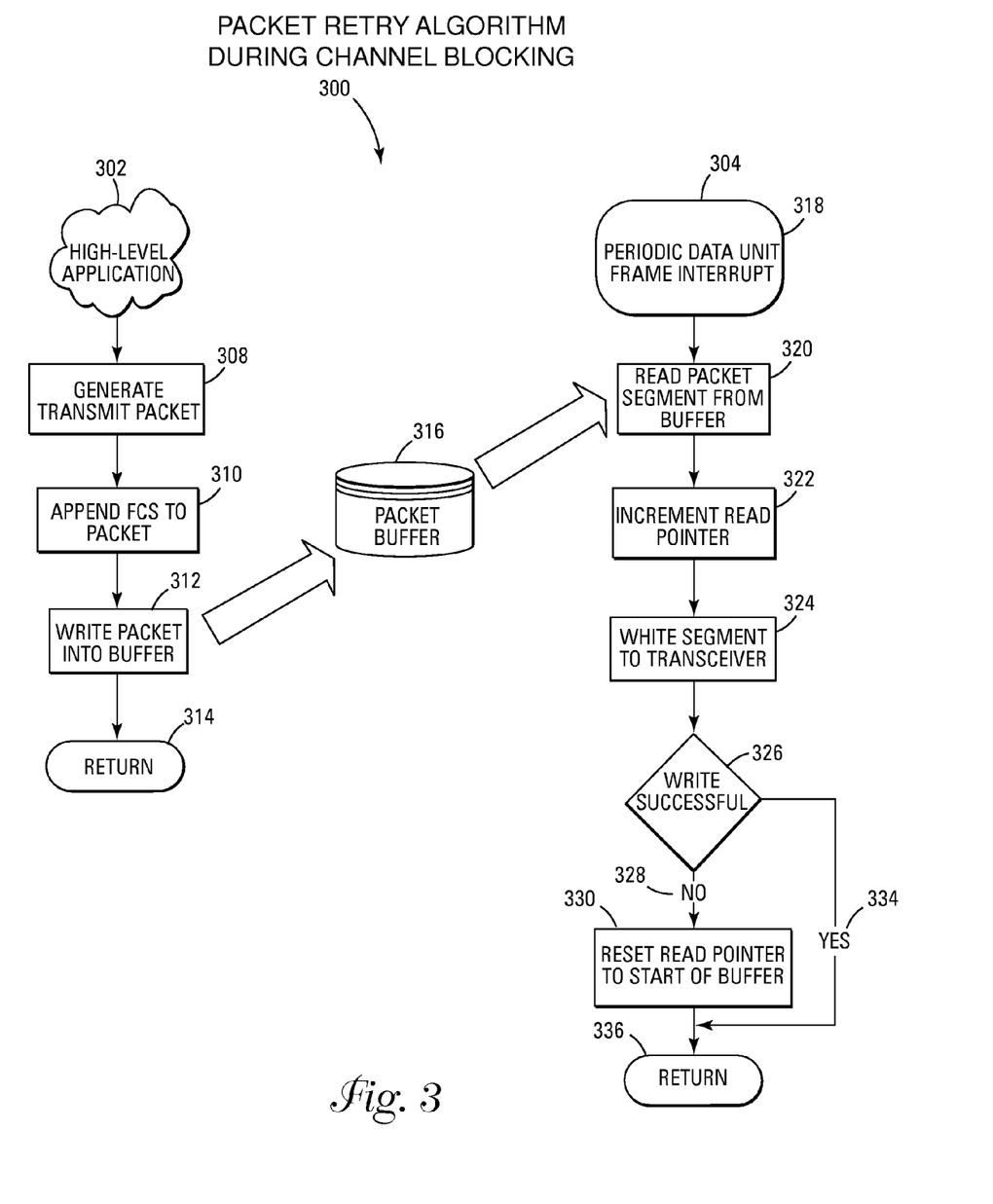
FIG. 3 is a simplified flowchart of a communication system packet abort/retry algorithm according to one embodiment of the present invention.

FIG. 3 is a simplified flowchart of a packet retry algorithm 300 of a communication device according to an embodiment of the present invention. Packet retry algorithm 300 of FIG. 3, contains two sub-algorithms, a high-level application packet generation algorithm 302 that generates EOC packets and fills a packet buffer 316 and an EOC packet transmission algorithm 304 that reads data from packet buffer 316 and transmits it over an EOC channel of a communication link.

High-level application packet generation algorithm 302, includes a high-level application running on the communication device, such as a configuration program, a terminal program communicating through a craft port, a communication device operation control program, or the like. Application needs to send data to a remote communication device over the EOC channel. High-level application generates 308 a packet of data to transmit across the EOC channel of a coupled communication link. A frame check sequence (FCS) checksum is generated and appended 310 to the data packet. The data packet and FCS checksum are then written 312 into the packet buffer 316 when space is available (typically after the previous EOC packet contents of the buffer have been transmitted and it has been released by the EOC transmit circuit for use). After the generated data packet and FCS checksum have been written into packet buffer 316 the high-level algorithm returns 314 and control returns to the high-level application until it generates and places the next data packet into the EOC packet buffer 316.

In the EOC packet transmission algorithm 304 of FIG. 3, the communication device transmitting an EOC packet across a protocol communication link EOC channel receives a periodic data link frame interrupt 318 indicating that the EOC channel portion of the protocol data frame has been reached. The EOC packet transmission algorithm 304 then reads 320 a segment of the data from the EOC packet buffer 316 and increments 322 the read pointer to point to the current beginning of the unread data of the packet buffer 316. The packet segment read from packet buffer 316 by the EOC packet transmission algorithm 304 is then written to the interface circuit/chipset 324 to transmit the selected data segment of the EOC data packet over the EOC section of the communication link protocol frame. The EOC packet transmission algorithm 304 then checks the interface circuit/chipset to see if the write was successful 326 and that there were no transmission errors. If the write was not successful and the transmission has errored 328 the read pointer of the EOC packet buffer is reset 330 to the start of the buffer, aborting the transmission of the current EOC data packet and restarting its transmission from the beginning of the packet. The EOC packet transmission algorithm 304 then returns 336 to wait for the next periodic data link frame interrupt 318. If the write was successful and no transmission error has occurred 334, the EOC packet transmission algorithm 304 then returns 336 to wait for the next periodic data link frame interrupt 318 to transmit the next EOC packet segment. The EOC packet transmission algorithm 304 continues in this manner until the entire EOC packet has been successfully transmitted from the packet buffer 316 and the buffer has been released to be refilled with the next EOC packet by high-level application packet generation algorithm 302.

Alternative communication system and device embodiments of the present invention with an improved EOC packet retry circuit and/or method will be apparent to those skilled in the art with the benefit of the present disclosure, and are also within the scope of the present invention.

CONCLUSION

An apparatus and method have been described that allows for improved transmission of EOC data over the EOC channels of communication devices and links, reducing the number of dropped EOC packets and increasing the bandwidth and robustness of the EOC channel. The improved device apparatus and method also allows for the reduction of the overhead of EOC channel error detection and correction on the limited resources of the communication device by aborting a corrupted or blocked EOC packet transmission and automatically resending. The improved device apparatus and method additionally allows the reduction of dropped EOC data packets due to corrupted transmission and the resultant miscommunication and corruption of high-level applications of the communication device, such as operation commands, remote configuration and management programs, and operation displays.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication device, comprising:
   a processor;
   a packet buffer coupled to the processor;
   at least one communication interface;
   a chipset coupled to the at least one communication interface and the processor, wherein the chipset communicates through the communication interface using a communication protocol having an embedded operation channel (EOC);
   wherein the processor is adapted to transmit data from the packet buffer across the EOC channel of the communication protocol utilizing a read buffer pointer to mark the start of untransmitted data in the packet buffer; and
   wherein the processor is adapted to reset the read buffer pointer to the start of the packet buffer when a transmission error at the communication device is sensed on the EOC channel by the chipset.

2. The communication device of claim 1, wherein the communication device is a High-Speed Digital Subscriber Line (HDSL) communication device.

3. The communication device of claim 2, wherein the HDSL communication device is a 4-wire HDSL communication device.

4. The communication device of claim 2, wherein the HDSL communication device is a 2-wire HDSL communication device.

5. The communication device of claim 1, wherein the communication device is coupled to a terminal communication device via a craft port.

6. The communication device of claim 1, wherein the processor is coupled to a computer usable storage medium.

7. The communication device of claim 1, wherein the processor is adapted to reset the read buffer pointer to the start of the packet buffer when a transmission error is sensed on the EOC channel at the completion of transmitting the contents of the packet buffer.

8. The communication device of claim 1, wherein the processor is adapted to transfer data to the packet buffer from a high-end application executing on the processor.

9. The communication device of claim 1, wherein the processor is adapted to generate a data packet, append a Frame Check Sequence (FCS) to the data packet, and place the data packet into the packet buffer when space is available in the packet buffer.

10. A communication system, comprising:
a communication link carrying a communication protocol with an embedded operation channel (EOC); and
a plurality of communication devices coupled to the communication link, wherein at least one of the plurality of communication devices comprises:
a processor;
a packet buffer coupled to the processor;
a chipset coupled to the communication link and the processor, wherein the chipset communicates on the communication link utilizing a communication protocol;
wherein the processor is adapted to transmit data from the packet buffer across the EOC channel of the communication link utilizing a read buffer pointer to mark the start of untransmitted data in the packet buffer; and
wherein the processor is adapted to reset the read buffer pointer to the start of the packet buffer when a transmission error at the at least one communication device is sensed on the EOC channel by the chipset.

11. The communication system of claim 10, wherein at least one of the plurality of communication devices is coupled to a terminal communication device via a craft port.

12. The communication system of claim 10, wherein the communication link is a High-Speed Digital Subscriber Line (HDSL) communication link.

13. The communication system of claim 12, wherein the HDSL communication link is a 4-wire HDSL communication link.

14. The communication system of claim 12, wherein the HDSL communication link is a 2-wire HDSL communication link.

15. The communication system of claim 10, wherein the processor of the at least one communication device is coupled to a computer usable storage medium.

16. The communication system of claim 10, wherein the processor of the at least one communication device is adapted to reset the read buffer pointer to the start of the packet buffer when a transmission error is sensed on the EOC channel of the communication link at the completion of transmitting the contents of the packet buffer.

17. The communication system of claim 10, wherein the processor of the at least one communication device is adapted to fill the packet buffer with data from a high-end application executing on the processor of the communication device.

18. The communication system of claim 17, wherein the high-end application is a management and configuration program.

19. The communication system of claim 10, wherein the processor of the at least one communication device is adapted to communicate with another communication device over the EOC channel of the communication link.

20. The communication system of claim 10, wherein the processor of the at least one communication device is adapted to execute a high-end application and communicate data from the high-end application across the EOC channel.

21. The communication system of claim 20, wherein the high-end application selectively configures the communication device by transceiving data across the EOC channel.

22. The communication system of claim 10, herein the processor of the at least one communication device is adapted to generate a data packet, append a Frame Check Sequence (FCS) to the data packet, and place the data packet into the packet buffer when space is available in the packet buffer.

23. A method of operating a communication device, comprising:
sending data on an embedded operation channel (EOC) of a communication interface from data stored in a packet data buffer, wherein a buffer pointer is utilized in transferring data in the data buffer; and
resetting the buffer pointer to the staff of data in the packet buffer when an EOC transmission error occurs at the communication device.

24. The method of claim 23, further comprising:
storing EOC channel transmission routines on a machine readable storage medium.

25. The method of claim 23, wherein resetting the buffer pointer to the start of data in the packet buffer when an EOC transmission error occurs further comprises resetting the buffer pointer to the staff of data in the packet buffer when an EOC transmission error occurs after sending the contents of the packet data buffer.

26. The method of claim 23, wherein resetting the buffer pointer to the staff of data in the packet buffer when an EOC transmission error occurs further comprises resetting the buffer pointer to the start of data in the packet buffer as soon as an EOC transmission error is sensed.

27. The method of claim 23, wherein sending data on an embedded operation channel (EOC) of a communication interface further comprises sending data on an embedded operation channel (EOC) of a 2-wire High-Speed Digital Subscriber Line (HDSL) protocol communication interface.

28. The method of claim 23, wherein sending data on an embedded operation channel (EOC) of a communication interface further comprises sending data on an embedded operation channel (EOC) of a 4-wire High-Speed Digital Subscriber Line (HDSL) protocol communication interface.

29. The method of claim 23, wherein the communication device is a Central Office (CO) communication device.

30. The method of claim 23, wherein the communication device is a Customer Premise Equipment (CPE) communication device.

31. The method of claim 23, further comprising:
executing a high-level application on a processor of the communication device.

32. The method of claim 31, wherein executing a high-level application on a processor of the communication device further comprises executing a configuration and management high-level application having configuration menus on a processor of the communication device.

33. The method of claim 31, wherein executing a high-level application on a processor of the communication device further comprises executing an inter-link operation communication high-level application on a processor communication device.

34. The method of claim 31, wherein executing a high-level application on a processor of the communication device further comprises executing a high-level communication application on a processor of the communication device that transfers data from a terminal device coupled to a craft port of the communication device to the EOC channel.

35. The method of claim 31, further comprising:
generating a data packet with the high level application;
appending a Frame Check Sequence (FCS) to the data packet; and
placing the data packet into the packet buffer when space is available in the packet buffer.

36. A method of operating a communication system, comprising:
   transmitting data from a packet buffer of a first communication device on an embedded operation channel (EOC) of a coupled communication link;
   receiving data at one or more second communication devices from the EOC channel of the communication link; and
   restarting transmission of the data from the packet buffer of the first communication device when an EOC transmission error occurs at the first communication device.

37. The method of claim 36, wherein restarting transmission of the data from the packet buffer of the first communication device when an EOC transmission error occurs further comprises restarting transmission of the data from the packet buffer of the first communication device by resetting a buffer pointer to the start of data in the packet buffer.

38. The method of claim 36, further comprising:
   storing EOC channel transmission routines on a machine readable storage medium.

39. The method of claim 36, wherein restarting transmission of the data from the packet buffer of the first communication device when an EOC transmission error occurs further comprises restarting transmission of the data from the packet buffer of the first communication device after sending the contents of the packet data buffer when an EOC transmission error occurs.

40. The method of claim 36, wherein restarting transmission of the data from the packet buffer of the first communication device when an EOC transmission error occurs further comprises restarting transmission of the data from the packet buffer of the first communication device as soon as an EOC transmission error is detected.

41. The method of claim 36, wherein the communication link is a 2-wire High-speed Digital Subscriber Line (HDSL) communication link.

42. The method of claim 36, wherein the communication link is a 4-wire High-speed Digital Subscriber Line (HDSL) communication link.

43. The method of claim 36, wherein the first communication device is a Central Office (CO) communication device and the second communication device is a Customer Premise Equipment (CPE) communication device.

44. The method of claim 36, wherein the first communication device is a Customer Premise Equipment (CPE) communication device and the second communication device is a Central Office (CO) communication device.

45. The method of claim 36, further comprising:
   executing a high-level application on a processor of the first communication device.

46. The method of claim 45, wherein executing a high-level application on a processor of the first communication device further comprises executing a configuration and management high-level application having menus that communicates through the EOC channel of the communications link to the second communication device on a processor of the first communication device.

47. The method of claim 45, wherein executing a high-level application on a processor of the first communication device further comprises executing an inter-link operation communication high-level application that communicates through the EOC channel of the communications link to the second communication device on a processor of the first communication device.

48. The method of claim 45, wherein executing a high-level application on a processor of the first communication device further comprises executing a high-level communication application on a processor of the first communication device that couples data from a terminal device coupled to a craft port of the first communication device to the EOC channel.

49. The method of claim 45, wherein executing a high-level application on a processor of the first communication device further comprises executing a configuration and management high-level application having menus on a processor of the first communication device that communicates through the EOC channel of the communications link to a high-level communication application executing on a processor of the second communication device that couples data from a terminal device coupled to a craft port of the second communication device.

50. The method of claim 45, further comprising:
   generating a data packet with the high level application;
   appending a Frame Check Sequence (FCS) to the data packet; and
   placing the data packet into the packet buffer when space is available in the packet buffer.

51. A machine-usable medium having machine-readable instructions stored thereon for execution by a processor of a communication device to perform a method comprising:
   sending data on an embedded operation channel (EOC) of a communication interface from data stored in a packet data buffer, wherein a buffer pointer is utilized in transferring data in the data buffer; and
   resetting the buffer pointer to the staff of data in the packet buffer when an EOC transmission error occurs at the communication device.

52. The machine-usable medium of claim 51, wherein the communication device is a High-Speed Digital Subscriber Line (HDSL) communication device.

53. The machine-usable medium of claim 51, further comprising:
   storing EOC channel transmission routines on a machine readable storage medium.

54. The machine-usable medium of claim 51, wherein resetting the buffer pointer to the start of data in the packet buffer when an EOC transmission error occurs further comprises resetting the buffer pointer to the start of data in the packet buffer when an EOC transmission error occurred after sending the contents of the packet data buffer.

55. The machine-usable medium of claim 51, wherein resetting the buffer pointer to the start of data in the packet buffer when an EOC transmission error occurs further comprises resetting the buffer pointer to the start of data in the packet buffer as soon as an EOC transmission error is sensed.

56. The machine-usable medium of claim 51, further comprising:
   executing a high-level application on a processor of the communication device.

57. The machine-usable medium of claim 56, wherein executing a high-level application on a processor of the communication device further comprises executing a configuration and management high-level application having configuration menus on a processor of the communication device.

58. The machine-usable medium of claim 56, further comprising:
   generating a data packet with the high level application;
   appending a Frame Check Sequence (FCS) to the data packet; and
   placing the data packet into the packet buffer when space is available in the packet buffer.

59. A method of operating a communication device, comprising:
   transmitting an EOC data packet on an embedded operation channel (EOC) of a communication interface from a packet buffer, wherein a buffer pointer is utilized in transferring the EOC data packet from the packet buffer to a communication interface circuit;
   aborting transmission of EOC data packet when an EOC transmission error occurs at the communication device; and
   retrying transmission of the EOC data packet by resetting the buffer pointer to the start of the EOC data packet in the packet buffer.

60. A method of operating a communication device, the method comprising:
   reading a segment of data from a packet buffer;
   incrementing a buffer pointer to the start of unread data in the packet buffer;
   writing the segment of data to a chipset of the communication device to transmit the segment of data over an embedded operation channel (EOC) of a communication link;
   checking at the communication device if writing the segment to the chipset was successful, wherein an unsuccessful write indicates a transmission error; and
   resetting the buffer pointer to the start of data in the packet buffer when a transmission error occurs at the communication device.

61. A method of operating a communication device, the method comprising:
   sending data on an embedded operation channel (EOC) of a communication interface from data stored in a packet data buffer, wherein a buffer pointer is utilized in transferring data in the data buffer; and
   resetting the buffer pointer to the start of data in the packet buffer when an EOC transmission error at the communication device is detected by the communication device.

62. A method of operating a communication device, the method comprising:
   reading a segment of data from a packet buffer;
   incrementing a buffer pointer to the start of unread data in the packet buffer;
   writing the segment of data to a chipset of the communication device to transmit the segment of data over an embedded operation channel (EOC) of a communication link;
   checking at the communication device if writing the segment to the chipset was successful;
   resetting the buffer pointer to the start of data in the packet buffer when writing the segment to the chipset was unsuccessful.

* * * * *

UNITED STATES PATENT AND TRADEMARK OFFICE
CERTIFICATE OF CORRECTION

PATENT NO.         : 7,330,423 B2                                    Page 1 of 1
APPLICATION NO.    : 10/179566
DATED              : February 12, 2008
INVENTOR(S)        : Kasper, II et al.

It is certified that error appears in the above-identified patent and that said Letters Patent is hereby corrected as shown below:

Claim 26, Column 10, Line 21, replace "staff" with --start--

Claim 51, Column 12, Line 29, replace "staff" with --start--

Signed and Sealed this

Twenty-fifth Day of May, 2010

David J. Kappos
*Director of the United States Patent and Trademark Office*